United States Patent
Murphy et al.

(10) Patent No.: US 7,333,681 B2
(45) Date of Patent: Feb. 19, 2008

(54) INTRUSION DETECTION AND LOCATION SYSTEM FOR USE ON MULTIMODE FIBER OPTIC CABLE

(75) Inventors: Cary R. Murphy, Hickory, NC (US); Mark K. Bridges, Hickory, NC (US); David E. Vokey, Sidney (CA)

(73) Assignee: Network Integrity Systems, Inc., Conover, NC (US)

( * ) Notice: Subject to any disclaimer, the term of this patent is extended or adjusted under 35 U.S.C. 154(b) by 11 days.

(21) Appl. No.: 11/461,661

(22) Filed: Aug. 1, 2006

(65) Prior Publication Data
US 2007/0133922 A1    Jun. 14, 2007

Related U.S. Application Data

(60) Provisional application No. 60/704,913, filed on Aug. 3, 2005.

(51) Int. Cl.
    *G02B 6/00*    (2006.01)
(52) U.S. Cl. ........................................................ 385/12
(58) Field of Classification Search .................. 385/12
    See application file for complete search history.

(56) References Cited

U.S. PATENT DOCUMENTS

| 5,848,204 A | * | 12/1998 | Wanser ........................ 385/12 |
| 7,120,324 B2 | * | 10/2006 | Murphy et al. ............... 385/12 |
| 2006/0002649 A1 | * | 1/2006 | Murphy et al. ............... 385/12 |

* cited by examiner

*Primary Examiner*—Ellen E. Kim
(74) *Attorney, Agent, or Firm*—Adrian D. Battison; Michael R. Williams; Ryan W. Dupuis

(57) ABSTRACT

A telecommunications multimode optical fiber is secured against intrusion by detecting manipulation of the optical fiber prior to an intrusion event. Pulses are injected using a launch arrangement which generates a narrow spectral width, under-filled, non-uniform mode field power distribution in the multimode optical fiber and Fresnel reflections and Rayleigh backscattering from the pulse are detected at the transmit end to monitor the modal power distribution in the fiber which changes on manipulation of the fiber. The Rayleigh backscattering time sliced data can be stored in a register until an intrusion event is detected. The detection is carried out by a modal power distribution detection system which includes an optical coupler to tap off a portion of the light which contains the higher order signal modes.

10 Claims, 4 Drawing Sheets

INTRUSION DETECTION AND LOCATION SYSTEM FOR USE ON MULTIMODE FIBER OPTIC CABLE

This application claims the benefit of the priority date under 35 USSC119 from Provisional Application 60/704,913 filed 3 Aug. 2005.

The present invention relates to the detection and location of physical intrusion into a multimode fiber optic cable.

This application is related to application Ser. No. 11/137,777 filed 26 May 2005 which is a continuation-in-part application of PCT Application PCT/US2004/021268 filed 2 Jul. 2004, the disclosure of which is incorporated herein by reference.

This application is related to application Ser. No. 11/152,680 filed Jun. 15, 2005 for AN INTRUSION DETECTION SYSTEM FOR USE ON SINGLE MODE OPTICAL FIBER, the disclosure of which is incorporated herein by reference.

BACKGROUND OF THE INVENTION

Multimode fiber optic backbone cables are being deployed to connect sections of high-speed networks together, and for long distance communications. To secure these high-speed networks, software based Intrusion Detection Systems (IDSs) have been introduced. These systems capture and analyze all packets for unusual patterns that point to an intrusion as well as monitor systems accessing a network. However, this adds to the complexity of the network and burdens processing power. Current IDSs are hampered by Base-Rate Fallacy limitation, which is the inability to suppress false alarms. Additionally, software-based IDSs do not provide protection against passive optical fiber tapping, which can go undetected by the network hardware. Software IDS is the de-facto standard for intrusion detection, however it is oblivious to actual physical layer intrusion and perturbation such as tapping or the attendant fiber handling.

It is well known, by those skilled in the technology, that optical fibers are easily tapped and the data stream intercepted. One relatively simple non-interruptive tapping method involves placing a bend coupler on the fiber to be tapped. A controlled bend of a critical radius is placed on the fiber. This causes a small spatial distortion in the core/cladding guiding properties and a fraction of the light escapes the fiber. A detector is located at the point of the light leakage and the data steam intercepted. Bend couplers typically introduce a loss of light power of up to 1 dB or more. Power measuring intrusion detection systems are available to detect this loss in optical power and provide warning alarms.

With care and skill, more insidious methods are available to the skilled intruder. With a sufficiently sensitive receiver and care in preparation, a fiber can be successfully tapped without introducing a telltale bend in the optical fiber. A successful tap can be achieved by carefully removing a few inches of the protective outer coating of the target fiber and polishing, etching, or otherwise reducing the outer cladding down by a few microns to form a flat coupling region. A cladding-to-cladding coupling is then made using a special intercept fiber. This method intercepts a portion of the weak but measurable evanescent power that propagates along the tapped fiber. In this case, the intercepted light, which is detected by a sensitive receiver, can easily be 20 or 30 dB down from the power in the fiber core. This results in a loss of received optical power of only 0.04 or 0.004 dB and is impossible to detect reliably by power measurement methods.

SUMMARY OF THE INVENTION

It is one object of the present invention to provide an arrangement for detecting movement of an optical fiber which overcomes the limitations with power loss detection methods and can detect intrusion activity before any optical power loss occurs.

According to the invention there is provided a method for detecting movement of a multimode optical fiber comprising:

providing a multimode optical fiber having a first end and a second end;

launching pulsed light signals into one end of the optical fiber from a source of light so as to establish a non-uniform mode field power distribution in the optical fiber;

for each pulse, sequentially detecting at said one end of the fiber a series of reflected time divided light signals which have been transmitted along the fiber;

comparing at least some of the received light signals relative to data obtained from light signals received in response to previous pulses to detect changes of modal power distribution of the received light signals relative to the previously received light signals by separating from the signals separate portions of the light containing the higher order signal modes;

analyzing the changes in modal power distribution to determine any changes which are indicative of manipulation of the optical fiber causing movement of a portion thereof along the length thereof;

and generating an alarm in response to the detection of any such changes which are indicative of manipulation of the optical fiber causing movement of a portion thereof along the length thereof.

Preferably the light signals are split into the separate paths by a first optical switch which separates the signals in time division such that the paths are selected sequentially.

Preferably there is provided the same optical switch or coupler for supplying the signals from the separate paths to a single receiving system for detecting changes in modal power distribution.

Preferably the method includes determining the location along the fiber of the said manipulation by:

detecting the signals at the same end as the light pulses are injected such that the signals contain reflected and/or Rayleigh backscattered components;

detecting the modal power distribution of a series of the light signals from the Rayleigh backscattering components in discrete time steps to generate for each time step data relating to the modal power distribution;

such that the data is time dependent and thus indicative of a time of travel of the light signals and thus of a location of the position from which the Rayleigh backscattering components have originated along the fiber;

storing the data in a register for a period of time and discarding the data after the period of time and replacing it with fresh data;

and, in the event that movement is detected of the optical fiber, extracting the data from the register and analyzing the Modal Distribution (MD) of the series of signals to detect the location of the movement.

Preferably the register is a FIFO.

Preferably the scattering signal level is typically orders of magnitude lower than the Fresnel Reflections and the Fresnel Reflections are typically infrequent and wherein the reflections are integrated along with the scattering such that the Fresnel Reflections integrate into a manageable signal and the total integrated signal is monitored for indication of fiber manipulation.

Preferably the scattering signal level is typically orders of magnitude lower than the Fresnel Reflections and the Fresnel Reflections are typically infrequent and wherein the large Fresnel reflections are sampled using a storage technique, this stored sample is compared to other dynamic or stored samples and this comparison is monitored for indication of fiber manipulation.

Preferably the pulsed light signals are launched using a laser transmitter that is coupled to a single mode fiber and offset launched into the multimode fiber.

Preferably the fiber forms one fiber of a cable of a plurality of fibers and wherein there is provided a switch for directing the optical transmission of information into any of the plurality of optical fibers.

Preferably the method includes monitoring of all secondary fibers of the plurality of fibers for intrusion to maintain the security and integrity of all possible fibers from intrusion in order to prevent a pre-emptive intrusion prior to the re-routing of data.

Thus there is provided an intrusion detection system that can sense and alarm any attempt to access the optical fibers in a multimode fiber optic communication cable. The present method monitors the active signal of a multimode optical fiber strand for signal degradation and disturbances in MD that could indicate fiber damage, handling, or physical intrusion.

The system uses the light output signal from a light source such as, but not limited to, a laser transmitter that is coupled to the single mode fiber; and offset launched into multimode fiber. In the detection portion of the invention, a detection system determines the modal power distribution of the light. Mechanical disturbances such as handling of the fiber cable cause shifts in the modal power distribution that is detected by the system and signals a possible intrusion attempt before an actual tap occurs.

Using adaptive filtering, normal background disturbances from environmental heating/cooling systems, road traffic, and background disturbances can be learned and filtered out. This will allow maximum sensitivity to intrusion attempt signatures while minimizing the probability of false alarm events. The design objective is to identify intrusion attempts while the attack is still at the outer layer of the cable structure. This will allow for rapid location and interception of any intruder.

The method allows the detection of fiber handling and/or intrusion by method of monitoring modal power distribution. This includes detection or measurement of the handling or disturbance of the optical fiber or cable, either as a prelude to, incident of, or as a result of an intrusion, as detected by any shift in MD of any portion of the light contained herein, originating from, or propagating through the optical fiber or cable being monitored.

The method includes providing an arrangement for directing the optical transmission of information into any of a plurality of optical fibers. This could be, but is not limited to an optical switch. Significant to this embodiment is the monitoring of all secondary fibers for intrusion, such as with this invention. The intention is to maintain the security and integrity of all possible fibers from intrusion in order to prevent a pre-emptive intrusion prior to the re-routing of data.

For illustration, if a perpetrator had unmonitored access to the secondary fiber, a fiber tap could be installed undetected. The primary fiber could then be perturbed, and when data is rerouted to the secondary, the data security is compromised. According to this invention, when an intrusion is attempted on any fiber, it will be detected; guaranteeing for the future the security of the system.

The arrangement described herein overcomes the limitations with power loss detection methods and can detect intrusion activity before any optical power loss occurs. Using well known OTDR methods, location of the intrusion can be identified and reported.

Thus there is provided an intrusion detection system that can sense and alarm any attempt to access the optical fibers in a fiber optic communication cable. The method monitors the modal power distribution of light in a multimode optical fiber strand for signal degradation and transient power disturbance patterns that could indicate fiber damage or physical intrusion. The system uses the light output signal from a specialized light source that is coupled to the multimode fiber in an offset launch alignment. At the receiver, a small percentage of the optical signal is sampled using a specially constructed optical coupler, which captures a portion of the higher order mode power. An optical receiver detects the sampled signal and the modal power distribution is monitored for changes. Mechanical disturbances such as handling of the optical fiber cause shifts in the mode power distribution that is detected by the system and signals a possible intrusion attempt before an actual tap occurs. Thus a standard optical time domain reflectometer (OTDR) is constructed, with the distinctions that the optical detector is replaced by a MD sensitive detector, and the optical light launch is configured for detection of fiber handling.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
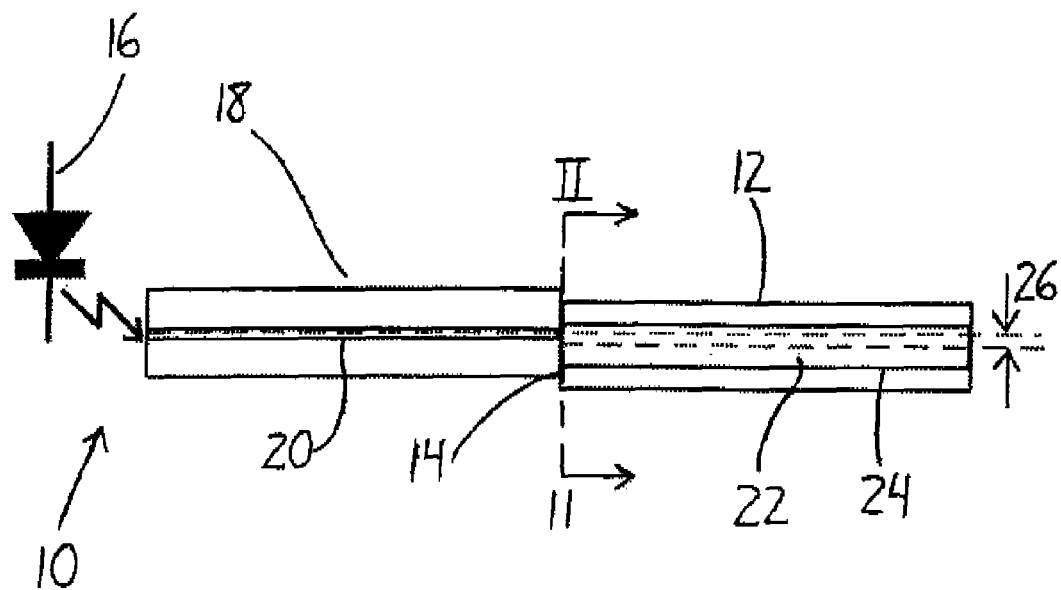
FIG. 1 is a longitudinal cross section showing an offset launch arrangement including a single mode fiber connected to a multimode fiber to be monitored for use in a system according to the present invention.
Figure 2:
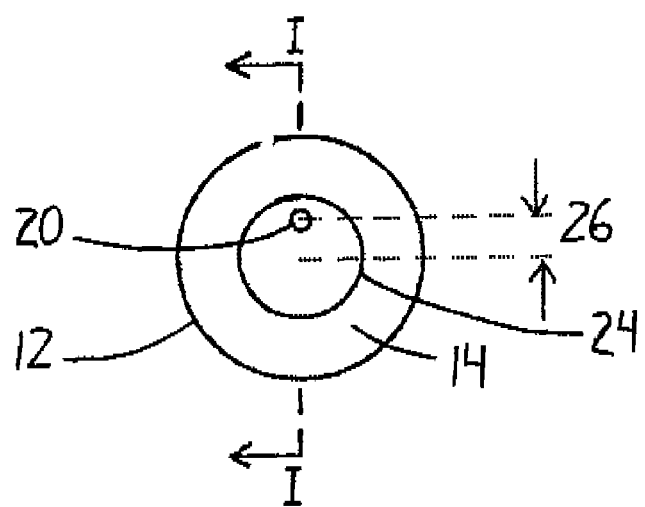
FIG. 2 is a transverse cross section of the fibers of FIG. 1.

Referring to the accompanying drawings, and particularly to FIGS. 1 and 2, a transmitter 10 is illustrated for setting up a narrow spectral width, under-filled, non-uniform mode field power distribution in a multimode optical fiber 12. With this type of mode field, the power distribution in the higher order modes changes with physical disturbance of the fiber, despite the absence of any power loss caused by the disturbance.

The non-uniform high order mode field may be set up in the multimode fiber 12 by illuminating the proximal (near) or transmit end 14 of the fiber with a point source of light that is offset from the center of the optical fiber core. This can be accomplished by a using a laser, optical lenses and positioning mechanics. In the illustrated embodiment, however, this is accomplished more simply by launching a laser 16 into a short length of single mode fiber 18 spliced to the multimode fiber with the center of its core 20 offset from the center of the core 22 of the multimode fiber 12 by a fixed offset 26. For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset).

Figure 3:
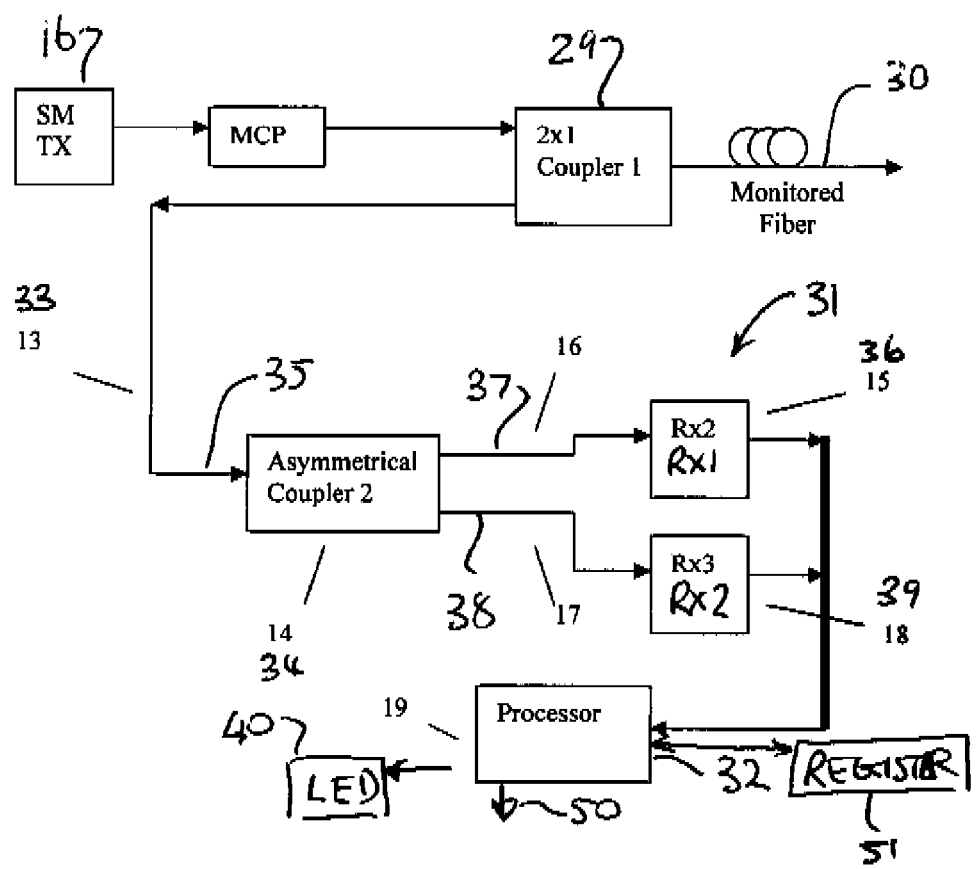
FIG. 3 is a Block diagram of an intrusion detection system according to the present invention using the launch conditions of FIGS. 1 and 2 into a multi-mode fiber.

Turning now to FIG. 3, light pulses from the light source 16 are launched into an optical splitter or coupler 29. The output of the coupler is attached to the monitored fiber 30. Optical reflections caused by Rayleigh Backscattering and Fresnel Reflections from the fiber pass through the splitter 29 and are fed into an MD sensitive receiver 31. The signal is then processed by the processor 32 such as, but not limited to, an A/D connected to a microprocessor.

At the receiver, the multimode optical fiber is connected by a connection 33 to the input 35 of an asymmetrical high order mode coupler 34. The coupler taps off a small portion of the higher order modes and passes the signal to a receiver Rx1 36. Handling of the fiber cable causes a local mechanical disturbance to the fiber. This mechanical disturbance, while not introducing detectable macro or micro bending losses, causes the power distribution in the mode pattern to change. This results in a change of the coupling efficiency of the high order mode coupler and a variation in the optical power at the output port 37. The resultant optical signal is proportional in amplitude to the disturbing forces. The filtered signal is then analyzed for transient signatures and level changes that are characteristic of cable and fiber handling. At a pre-set disturbance level the circuit activates the alarm response.

Employing the best features of the above configurations, the preferred embodiment utilizes the splitter such that one leg monitors power, and the other leg is monitored for intrusion. The main portion of the optical signal at the output 38 of the coupler 34 is passed to the receiver Rx2 39. The sampled output 37 of the mode coupler is forwarded to Rx1 as above. The detector and conversion circuits of the receivers 36, 39 where the optical signal is detected by a photo diode, may be converted from an analog electrical signal to a digital signal. The digital signal is forwarded to the microprocessor and communications circuit 32 where the signal trace is constructed in the time domain and filtered to eliminate normal environmental background noise.

When Rx 1 drops in power while Rx 2 remains constant, an intrusion is occurring. If they both change in power, an attenuation event is occurring, such as laser power fluctuation or a failing connector.

In summation: Rx 2 measures absolute optical power, and Rx 1 monitors intrusion. These comparisons, of course, are made on a scale relative to distance into the fiber (or time since laser pulse).

The high order mode coupler 34 can be made by a cladding-to-cladding fusion while measuring the tap-coupling ratio during the fusing process using an offset launch source as described.

The main portion of the optical signal is brought from coupler output 38 is available for a communication or data receiver when active fiber monitoring is employed. An alarm LED 40 is illuminated on a system status panel and an alarm signal is output to an interface connector 50 for remote alarm reporting.

Thus, fundamental to the arrangement herein is the setting up of an under-filled, non-uniform mode field power distribution in the multimode optical fiber. A non-uniform high order mode field can be set up in a multimode fiber by illumination the end of the fiber with a non-divergent source of light that is offset from the center of the optical fiber core. This can be accomplished, as described before, by a using a laser, optical lenses and positioning mechanics or more simply by launching a laser into a single mode fiber and concatenating the single mode fiber to a multi mode fiber with a fixed offset. This is referred to as a Mode Conditioning Pigtail (MCP).

For typical multimode fibers with either a 50 or 62.5 micron core, the single mode fiber, with a core size of approximately 10 microns, is spliced to the multimode fiber with a micron center-to-center offset which is optimized for maximum sensitivity (typically 5 to 20 micron offset). The high order mode coupler can be made by a cladding-to-cladding fusion while measuring the tap-coupling ratio during the fusing process using an offset launch source as described.

In order to provide security beyond merely the alarm condition, an optical shutter or switch, in one embodiment, is inserted into the optical signal path such that an intrusion alarm can:

Interrupt the flow of data;

Re-route the data over a spare fiber; or

Introduce bad data or misinformation onto the fiber, foiling an intruder.

Yet further, backup fibers can be monitored with additional channels of the security system such that when data is re-routed as above, the data is re-routed to a fiber which is also already secured.

The processor 32 is required to monitor the modal power distribution of the time division signals from the reflected and/or Rayleigh backscattered components. One technique for minimizing/streamlining this is to collect and store distance data in a register 51 or other similar device such as, but not limited to, a FIFO; but to only analyze the quasi-CW signal from the Fresnel reflections in real time. This "quasi-CW" signal is comprised of the Fresnel reflections from the trace with a minor Rayleigh scattering component. These Fresnel reflections, on the order of 20-25 dB above the scattering are high in amplitude but low in duty cycle. They can be integrated along with the scattering, or captured by peak detecting sample and hold (or other technique). This quasi-CW signal is analyzed for an intrusion. When one is detected, the time dependant data in the register 51 is analyzed for location information.

The processing required for signal analysis of an intrusion detection system is not insignificant, algorithms which analyze the environment and filter out disturbances to be ignored are highly computationally intensive. When configuring a locating IDS, the task becomes much more complex. The signal analysis normally used for non-locating might need to be applied to every location in time along the vertical axis of the imaginary OTDR trace, perhaps 2000 locations or more. The CPU burden of applying conventional finite DSP to each of these elements is extreme. Thus the above technique of storing the data in the register until an intrusion event is detected can be used. While the intrusion event can be most effectively detected from the Fresnel reflections, other techniques using the other data such as data corresponding to a specific location in the fiber can be used to detect the intrusion event in real time; and only when the event has been detected is the bulk of the remaining data from the register used for location. The scattering signal level is typically orders of magnitude lower than the Fresnel Reflections and the Fresnel Reflections are typically infrequent so that the reflections are integrated along with the scattering such that the Fresnel Reflections integrate into a manageable signal and the total integrated signal is monitored for indication of fiber manipulation. Also the large Fresnel reflections can be sampled using a storage technique, this stored sample is compared to other dynamic or stored samples and this comparison is monitored for indication of fiber manipulation. One variation is to add a reflection at the far end of the cable, such as a connector with a gold deposition.

It will be appreciated that the monitoring system can be used with dark fiber either which are available as spare fibers or which are specifically dedicated as monitoring fibers. However in other cases, the monitoring system can be used with active fibers carrying data. In this case, if the monitor is to be used concurrently with data, a wavelength selective reflection can be used at the remote end to increase and/or control the intensity of the Fresnel reflections, such as a printed Bragg Grating, a wave length division multiplexer (WDM) and a reflective connector, or a WDM and fiber loop back.

Figure 4:
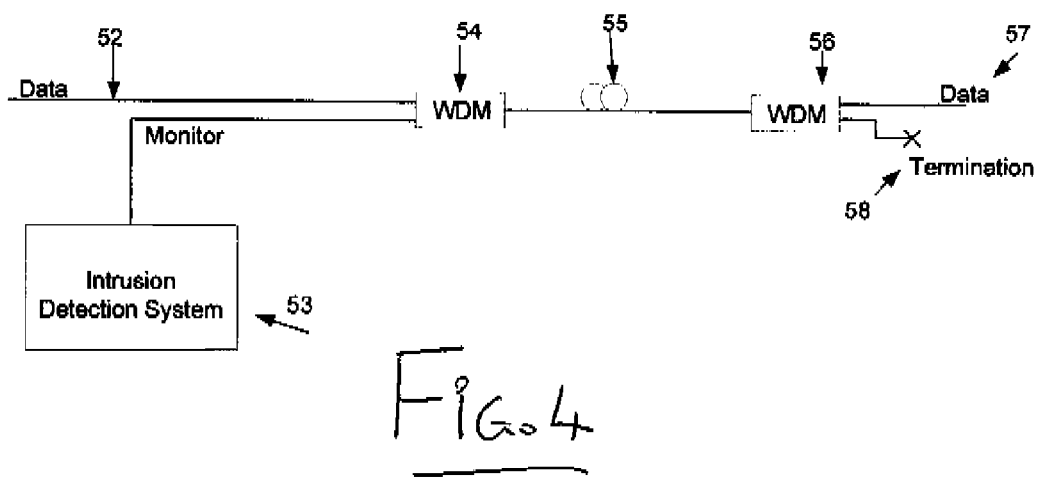
FIG. 4 is a block diagram showing the arrangement for monitoring a fiber carrying data (active fiber).

Turning now to FIG. 4 there is shown an arrangement using the monitoring system outlined in FIG. 3 which is configured for monitoring an optical fiber that is able to carry data. Fiber 52 introduces a signal of one wavelength, invention 53 introduces the monitor signal of a different wavelength. The two wavelengths are combined in a wavelength division multiplexer (WDM) 54 for launch into the monitored fiber 55. At the distal end, the two wavelengths are de-multiplexed by a WDM 56. The signal introduced at 52 is extracted, while the monitor signal from 53 is terminated 58.

Figure 5:
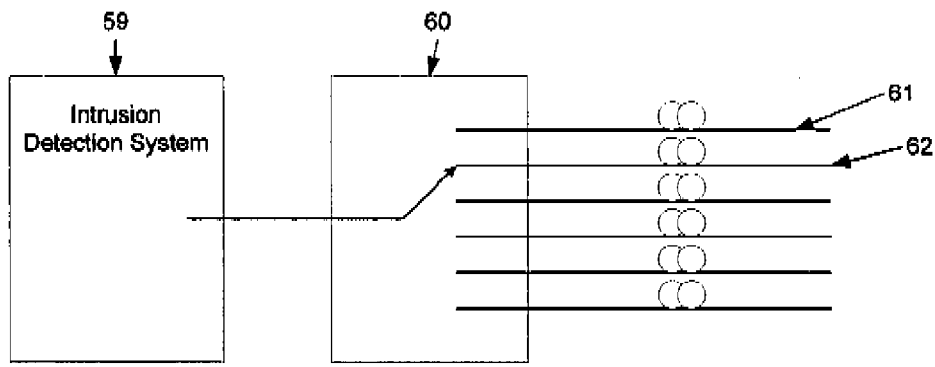
FIG. 5 is a block diagram showing the arrangement for monitoring a plurality of dark fibers of a cable.

Turning now to FIG. 5 there is shown an arrangement using the monitoring arrangement shown in FIG. 3 which is configured for monitoring a plurality of fibers in a cable. Thus the fiber 30 above forms one fiber of a cable of a plurality of fibers and wherein there is provided a switch for directing the optical transmission of information into any of the plurality of optical fibers. The device acts to monitor of all secondary fibers of the plurality of fibers for intrusion to maintain the security and integrity of all possible fibers from intrusion in order to prevent a pre-emptive intrusion prior to the re-routing of data. The system 59 is connected to an optical switch 60, which is a device that routes the bi-directional signal on an input fiber to any one of the fibers on the output. Switch 60 then directs the signal to the first fiber 61 for testing, then the second fiber 62 for testing, and so on. The data from the testing of each fiber may be stored for comparison to subsequent tests of the respective fiber.

Figure 6:
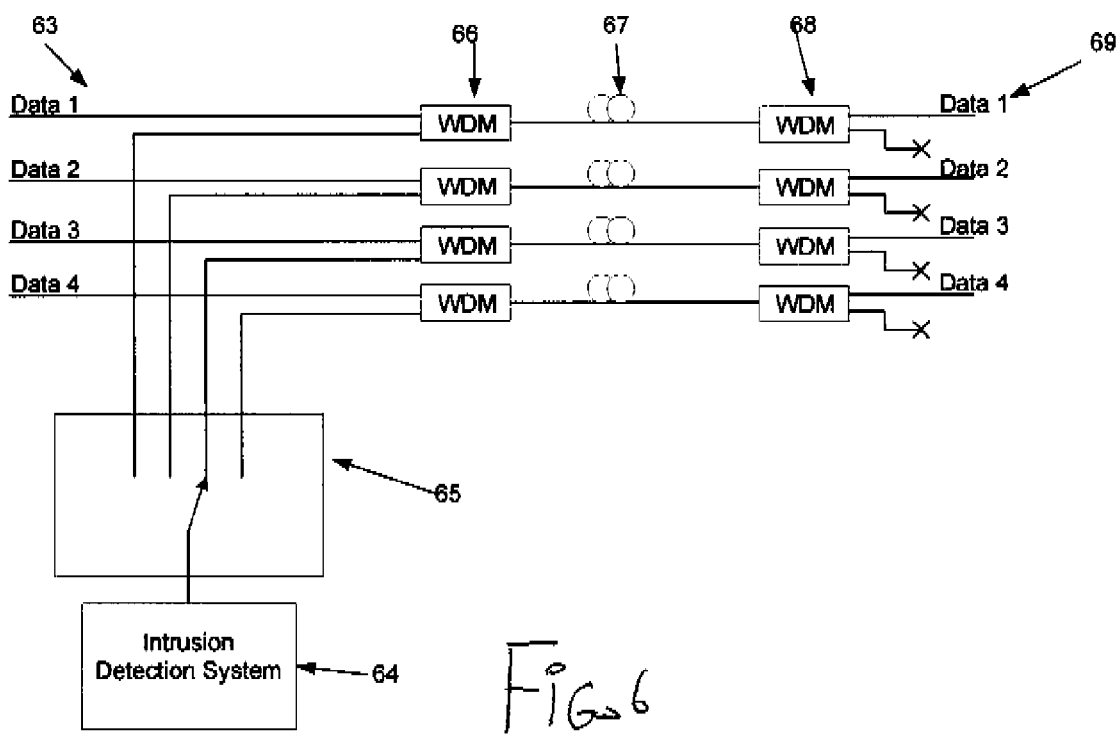
FIG. 6 is a block diagram showing the arrangement for monitoring a plurality of active fibers of a cable.

Turning now to FIG. 6 there is shown an arrangement using the monitoring arrangement shown in FIG. 5 which is configured for monitoring fibers which are able to carry a data (or other) signal. In essence, in a combination of FIGS. 4 and 5, data is introduced through a fiber 63. The system 64 outputs a signal of a separate wavelength from the data signal of 63, and this monitor wavelength enters the optical switch 65. As in FIG. 5, this switch allows the monitor wavelength to be routed to various fibers. These fibers feed WDMs 66, where the monitor and data wavelengths are combined for transmission down the protected fiber 67. This combined signal is de-multiplexed at the distal end by WDMs 68, delivering the data to fibers 69, while terminating the monitoring wavelength.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for detecting movement of a multimode optical fiber comprising:

providing a multimode optical fiber having a first end and a second end;

launching pulsed light signals into one end of the optical fiber from a source of light so as to establish a non-uniform mode field power distribution in the optical fiber;

for each pulse, sequentially detecting at said one end of the fiber a series of reflected time divided light signals which have been transmitted along the fiber;

comparing at least some of the received light signals relative to data obtained from light signals received in response to previous pulses to detect changes of modal power distribution of the received light signals relative to the previously received light signals by separating from the signals separate portions of the light containing the higher order signal modes;

analyzing the changes in modal power distribution to determine any changes which are indicative of manipulation of the optical fiber causing movement of a portion thereof along the length thereof;

and generating an alarm in response to the detection of any such changes which are indicative of manipulation of the optical fiber causing movement of a portion thereof along the length thereof.

2. The method according to claim 1 wherein the series of reflected time divided light signals are split into separate paths by a first optical switch which separates the signals in time division such that the paths are selected sequentially.

3. The method according to claim 1 wherein there is provided a second optical switch or a coupler for supplying the signals from the separate paths to a single receiving system for detecting changes in modal power distribution.

4. The method according to claim 1 wherein the method includes determining the location along the fiber of the said manipulation by:

detecting the signals at the same end as the light pulses are injected such that the signals contain reflected and/or Rayleigh backscattered components;

detecting the modal power distribution of a series of the light signals from the Rayleigh backscattering components in discrete time steps to generate for each time step data relating to the modal power distribution;

such that the data is time dependent and thus indicative of a time of travel of the light signals and thus of a location of the position from which the Rayleigh backscattering components have originated along the fiber;

storing the data in a register for a period of time and discarding the data after the period of time and replacing it with fresh data;

and, in the event that movement is detected of the optical fiber, extracting the data from the register and analyzing the modal power distribution of the series of signals to detect the location of the movement.

5. The method according to claim 4 wherein the register is a FIFO.

6. The method according to claim 4 wherein the backscattering components have a level which is typically orders of magnitude lower than the reflected light and the reflected light is typically infrequent, and wherein the reflected light is integrated such that the reflected light integrate into a manageable signal and the total integrated signal is monitored for indication of fiber manipulation.

7. The method according to claim 4 wherein the backscattering components have a level which is typically orders of magnitude lower than the reflected light and the reflected light is typically infrequent and wherein the reflected light is sampled using a storage technique, this stored sample is compared to other dynamic or stored samples and this comparison is monitored for indication of fiber manipulation.

8. The method according to claim 1 wherein the pulsed light signals are launched using a laser transmitter that is coupled to a single mode fiber and offset launched into the multimode fiber.

9. The method according to claim 1 wherein the fiber forms one fiber of a cable of a plurality of fibers and wherein there is provided a switch for directing the optical transmission of information into any of the plurality of optical fibers.

10. The method according to claim 9 including monitoring of all secondary fibers of the plurality of fibers for intrusion to maintain the security and integrity of all possible fibers from intrusion in order to prevent a pre-emptive intrusion prior to the re-routing of data.

* * * * *